Feb. 13, 1951     J. L. CUNNINGHAM     2,541,862
SCALE SEALING MEANS
Filed Aug. 13, 1947
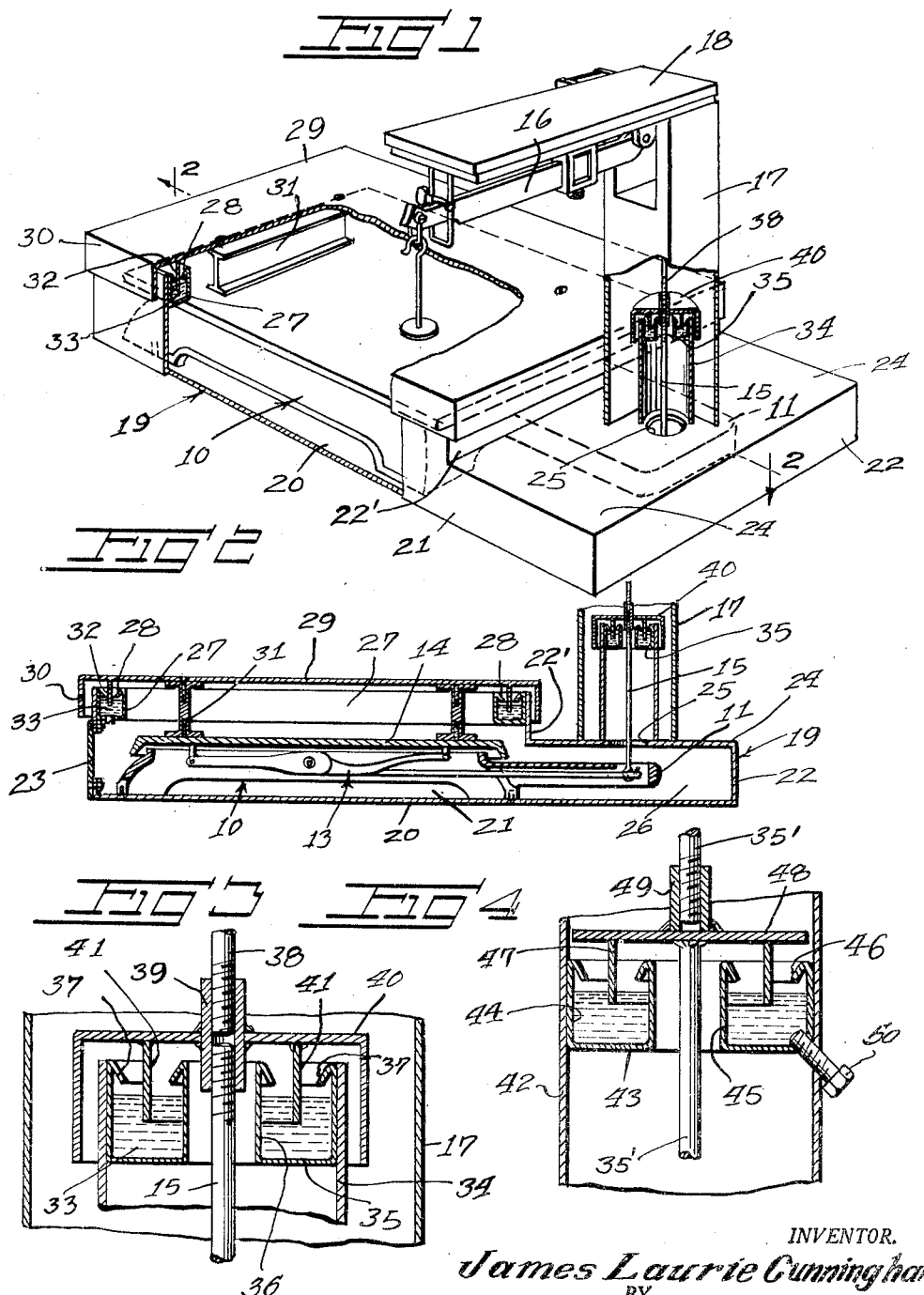
INVENTOR.
James Laurie Cunningham
BY
Wilfred Lawson
Attorney Patented Feb. 13, 1951

2,541,862

UNITED STATES PATENT OFFICE 2,541,862

SCALE SEALING MEANS

James L. Cunningham, Augusta, Ga.

Application August 13, 1947, Serial No. 768,420

3 Claims. (Cl. 265—27)

This invention relates generally to weighing scales and has for a particular object to provide a means for enclosing moving parts in an air and dust proof chamber or enclosure.

A principal object of the present invention is to provide a sealing means for scales wherein the movable platform is connected with and joined to a stationary part of the structure by means of a fluid seal which prevents the entrance of moisture, dust, chemical fumes or other substances into the area occupied by the scale beams or levers whereby said beams or levers are effectively protected against damage by dust, moisture or the like.

A further object of the invention is to provide a fluid sealed housing or enclosure for the platform of scales of the platform type, said housing or enclosure having as a part thereof an auxiliary platform which is mounted upon and carried by the regular platform of the scales, with a fluid seal or connection between the auxiliary platform and the housing which permits free unrestricted movement of the auxiliary platform and the regular scale platform but at the same time prevents the entrance of air, moisture, fumes or insects into the area occupied by the platform or scale levers.

Still another objecct of the invention is to provide a protective housing for scales of the platform type wherein, in addition to providing the mechanism enclosing housing and auxiliary platform connected with the housing in the manner stated, means is provided for establishing a fluid seal or connection between the pillar and the pillar rods whereby the entrance of moisture, fumes or insects into the part of the housing occupied by the pivoted levers is effectively prevented.

The invention will be best understood from a consideration of the following detailed description taken in connection with the accompanying drawing forming a part of the specification, with the understanding, however, that the invention is not to be understood as limited to the exact details of construction shown and described since obvious modifications will occur to a person skilled in the art.

In the drawing:

Figure 1 is a view in perspective of a scale of the platform type showing the application thereto of the protective structure constituting the present invention.

Figure 2 is a vertical longitudinal section taken substantially on the line 2—2 of Figure 1.

Figure 3 is a detail section taken on an enlarged scale through the beam rod seal which is enclosed in the scale pillar.

Figure 4 is a detail section through a portion of the pillar showing a modified construction of the seal between the pillar and the beam rod.

Referring now more particularly to the drawing the numeral 10 generally designates the base portion or frame of a platform scales, which frame has at its front end a forwardly projecting portion 11 into which extends an element 12 forming a part of the lever mechanism which is generally designated 13. This lever mechanism 13 supports a movable platform 14 upon which is placed material to be weighed and the movement of this platform operates, through the mechanism 13, a beam rod 15 which is connected at one end with the element 12 and extends vertically and has operative connection with the weight carrying beam 16. These parts are all standard in well known types of platform scales and in addition such platform scales include a hollow pillar which is designated 17, which has fixed to its upper end an end of a flat cap 18 beneath which the beam 16 operates.

While the present invention as hereinafter specifically described is associated in the present disclosure with a platform type scales it is to be understood that the invention is not confined to the use of scales of this particular type but may be used in association with automatic dial and computing scales or any other types of scales where it may be found applicable.

In accordance with the present invention there is provided a box or housing which is generally designated 19. This housing has the bottom wall 20, vertical side walls 21, front end wall 22 and the removable back wall 23. At its forward end the housing 19 includes a short horizontal top wall 24 in which is formed an opening 25. This horizontal top wall 24 extends rearwardly through a portion of the length of the housing as, for example, approximately a third of the length of the housing where it joins the short upright or vertical front wall extension 22'. The top edge of this front wall extension 22' and the top edges of the side walls rearwardly thereof and the back wall lie in a higher plane than the wall 24 so that there is provided at the forward end of the housing the relatively low chamber 26.

The housing is designed to have introduced thereinto the platform frame 10 with the forward extension 11 thereof projecting into the low chamber 26 to a position where the beam rod 15 may be extended downwardly through the opening 25 for connection with the element 12.

The area defined by the top edges of the walls 21, 22' and 23 provides an upwardly directed opening for the housing 19 and within this area there is secured to the inner sides of the walls the rectangular receptacle 27 which opens upwardly and which has the inwardly and downwardly directed flanges 28 formed integrally with the top edges of the walls thereof.

The scale platform 14 lies within the area defined by the last mentioned walls but below the level of the receptacle 27. Overlying the platform 14 is the auxiliary platform 29 which completely covers the opening in the top of the housing, extending beyond the walls 21, 22' and 23 and having the downturned encircling flange 30 which is in spaced relation with these walls.

Suitable supporting blocks 31 are mounted upon the scale platform 14 and are secured to the underside of the auxiliary platform 29 so as to securely join the two platforms for unitary movement.

Formed integral with the underside of the auxiliary platform 29 is the downwardly projecting blade 32 which defines a rectangle of the same size as that defined by the trough or receptacle 27 and is adapted to extend down into the receptacle between the downwardly converging edges of the flanges 28, into the fluid 33 which the receptacle 27 contains. Thus it will be seen that the platforms are free to move up and down in the conventional manner but the seal will be maintained at all times between the auxiliary platform and the adjacent walls of the housing in which the frame 10 and lever mechanism 13 are enclosed.

In carrying out the present invention the pillar 17 is mounted upon the wall 24 of the housing instead of upon the extension 11 of the scale frame 10 as is customary. Accordingly, as is clearly shown in Figures 1 and 2 the opening 25 in the housing wall 24 communicates directly with the pillar 17 and is positioned in the center thereof so that the beam rod 15 may pass up for connection with the beam 16.

Mounted upon the wall 24 within the pillar and secured to the wall in concentric relation with the opening 25 is a short tubular casing 34 through which the beam rod 15 passes. The upper end of this tubular casing is formed to provide an annular cup 35 by the provision of the circular or annular wall 36 within the upper end of the tubular casing and in spaced relation with the casing as shown. The top edge of this wall 36 and also the top edge of the tubular casing has the downwardly directed flange 37 corresponding to the flanges 28.

The beam rod 15 is preferably formed in two sections which are threaded as indicated at 38 and are joined by the threaded sleeve 39 whereby the length of the beam rod may be adjusted as desired. The sleeve portion 39 extends through a cap 40 which overlies and encloses the top end of the tubular casing and this cap carries on its underside the annular flange 41 which extends downwardly into the cup 35 as illustrated. As it will be readily understood this cup 35 is designed to be filled with a suitable fluid so as to form the necessary seal between the adjacent moving parts.

Figure 4 illustrates a modified construction of the steel between the beam rod and the hollow pillar through which it extends. In this construction the pillar is designated 42 and it has secured therein the rectangular fluid cup 43 which, is of the same rectangular outline as the pillar 42 and has the outside wall 44 secured to the adjacent wall of the pillar as shown. The numeral 45 designates the inside wall of the fluid cup and these walls 44 and 45 have the inwardly downwardly extending flanges 46 between which extend, into the cup, the annular flange 47 which forms an integral downwardly extending portion of the plate member 48. As shown this plate member is carried by one of the two sections of the beam rod which is here designated 35' and these sections of the beam rod are adjustably connected together by the sleeve or collar 49.

From the foregoing it will be readily apparent that the invention herein disclosed provides a positive protection for the moving lever mechanism of the scales in providing the fluid seal between the fixed and movable parts. In addition the construction of this fluid seal is such that the movements of the parts of the scales will not cause the fluid in the receptacles to be splashed out and lost. This splashing of the fluid is prevented by the inwardly and downwardly extending flanges which form a part of each fluid receptacle.

In order that the sealing fluid may be removed from the receptacles 35 and 43 when desired, a removable drain plug 50 may be provided as shown in Figure 4. While such a plug is not shown in association with the structure illustrated in Figure 3 it will be readily evident that the same or any other suitable means may be provided for removing or draining the liquid from the receptacle 35.

I claim:

1. Sealing means for a scale having a base, lever mechanism in the base, a platform mounted upon the lever mechanism and a beam rod operatively coupled with the lever mechanism; comprising a housing adapted to completely enclose the base and platform, said housing having an open top portion, an auxiliary platform overlying the open top portion of the housing and operatively coupled with the first platform for movement therewith, an open receptacle carried by the housing and extending around the opening of the top thereof beneath the auxiliary platform, said receptacle being designed to contain a fluid, a flange integral with the underside of the auxiliary platform and extending downwardly into the receptacle throughout the entire length thereof and into the fluid, a second open top receptacle encircling the beam rod, encasing means between the second receptacle and the housing and enclosing the lower part of the beam rod, said second receptacle being designed to contain a fluid, an element carried by the beam rod and overlying the open top of the second receptacle, and a flange carried by said element and extending downwardly into the open top of the second receptacle, the last mentioned flange completely encircling the beam rod.

2. A construction as set forth in claim 1, wherein said receptacles have inwardly and downwardly extending flanges integral with the inner and outer sides thereof and between which the auxiliary platform and beam rod flanges extend.

3. In a scale, a box-like base for housing portions of the scale weighing mechanism and base, the top side of said base having an opening therein, a fluid holding trough extending along the top edges of the base about said opening, a scale platform disposed over the opening in the base and operatively coupled with the weighing mechanism therein, said platform having a continuous depending strip along its under side for entry within the trough and of substantially the same outline as said trough forming a fluid seal therewith to prevent the entry of foreign matter within the base.

JAMES L. CUNNINGHAM.

REFERENCES CITED

The following references are of record in the file of this patent:

UNITED STATES PATENTS

| Number | Name | Date |
|---|---|---|
| 570,299 | Richards | Oct. 27, 1896 |
| 1,591,488 | Hem | July 26, 1926 |
| 1,878,205 | Ulrich | Sept. 20, 1932 |
| 2,287,814 | Meeker et al. | June 30, 1942 |
| 2,288,053 | Walter | June 30, 1942 |